(12) United States Patent
Itakura (10) Patent No.: US 6,339,502 B1
(45) Date of Patent: Jan. 15, 2002

(54) CASSETTE FOR STIMULABLE PHOSPHOR SHEET, ID RECOGNITION STRUCTURE THEREOF, AND IMAGE INFORMATION READING APPARATUS

(75) Inventor: Toru Itakura, Isehara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/533,660

(22) Filed: Mar. 23, 2000

(30) Foreign Application Priority Data

Mar. 24, 1999 (JP) .......................... 11-080421
Mar. 24, 1999 (JP) .......................... 11-080424

(51) Int. Cl.[7] .......................... B65H 5/00; G01N 23/04
(52) U.S. Cl. .................................... 359/589
(58) Field of Search ................ 250/589, 590, 250/581, 584; 378/165

(56) References Cited

U.S. PATENT DOCUMENTS

| | | | | |
|---|---|---|---|---|
| 5,334,851 A | * | 8/1994 | Good et al. | 250/582 |
| 5,418,355 A | * | 5/1995 | Weil | 235/375 |
| 6,032,856 A | * | 3/2000 | Bischoff et al. | 235/375 |
| 6,191,426 B1 | * | 2/2001 | Hayakawa et al. | 250/484.4 |

\* cited by examiner

Primary Examiner—Ricky Mack
(74) Attorney, Agent, or Firm—Sughrue Mion, PLLC (57) ABSTRACT

A cassette has a first bar code disposed on a lid thereof for being used for the user to register ID information and a second bar code disposed on a positioning reference surface of the cassette for being used to read ID information through a loading apparatus. The first and second bar codes are effective to determine whether a stimulable phosphor sheet housed in the cassette is either a single-sided sheet or a double-sided sheet.

16 Claims, 10 Drawing Sheets

CASSETTE FOR STIMULABLE PHOSPHOR SHEET, ID RECOGNITION STRUCTURE THEREOF, AND IMAGE INFORMATION READING APPARATUS

BACKGROUND OF THE INVENTION

1. Field of the Invention

The present invention relates to a cassette for housing a stimulable phosphor sheet, the cassette having various items of ID (identification) information, an ID recognition structure for such a cassette for recognizing the ID information when the cassette is loaded into a cassette loading unit, and an image information reading apparatus for reading radiation image information recorded in the stimulable phosphor sheet, thereafter erasing remaining radiation image information from the stimulable phosphor sheet, and returning the stimulable phosphor sheet into a cassette.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display device such as a CRT or the like.

When a radiation energy such as X-rays, α-rays, γ-rays, electron beams, ultraviolet radiation, or the like is applied to a certain phosphor, it stores part of the applied radiation energy. When stimulating light such as visible light is subsequently applied to the phosphor, the phosphor emits light depending the stored radiation energy. Such a phosphor is referred to as a stimulable phosphor. A stimulable phosphor is usually used in the form of a sheet which is referred to as a stimulable phosphor sheet.

The above known system includes an image information reading apparatus which comprises a reading section for reading image information recorded on a stimulable phosphor sheet, and an erasing section for erasing remaining image information from the stimulable phosphor sheet after the recorded image information has been read. In the image information reading apparatus, a cassette housing a stimulable phosphor sheet which bears radiation image information of a subject recorded by an external exposure device is inserted into a loading section.

Thereafter, the lid of the cassette is opened, and then the stimulable phosphor sheet is taken out of the cassette by a sheet feeding mechanism. The stimulable phosphor sheet is delivered to the reading section by a sheet delivering mechanism. In the reading section, the recorded image information is read from the stimulable phosphor sheet, and then remaining image information is erased from the stimulable phosphor sheet in the erasing section, after which the stimulable phosphor sheet is placed into the cassette which has been disposed in the loading section.

The stimulable phosphor sheet usually comprises an opaque base and a phosphor layer (recording layer) disposed on the opaque base. The reading section has a stimulating light applying means for applying stimulating light to the phosphor layer and a light guiding means for collecting light which is emitted from the phosphor layer when the stimulating light is applied to the phosphor layer. The erasing section has an erasing light source for applying erasing light to the phosphor layer.

There has recently been a demand for the efficient reading of energy stored in stimulable phosphor sheets in order to reproduce the radiation image information of subjects with high image quality in various applications such as mammography. One effort that has been made to meet the demand is to employ a stimulable phosphor sheet having a transparent base. When stimulating light is applied to the stimulable phosphor sheet with the transparent base from the side of the phosphor layer, the stimulable phosphor sheet emits light from the side of the base (reverse side) as well as from the side of the phosphor layer. An image information reading apparatus which is capable of reading image information from the stimulable phosphor sheet with the transparent base has a reading section including two light guiding means that are positioned respectively on the opposite sides of the stimulable phosphor sheet, and an erasing section which applies erasing light to the stimulable phosphor sheet from the side of the phosphor layer.

As described above, there are two types of stimulable phosphor sheets, i.e., a single-sided stimulable phosphor sheet which emits light from the recording layer (phosphor layer), and a double-sided stimulable phosphor sheet which emits light from the recording layer and the base. It has been pointed out that double-sided stimulable phosphor sheets cannot be recognized in a single image information reading apparatus. Specifically, if a bar code is attached to the base of a double-sided stimulable phosphor sheet, then light applied to read the bar code passes through the base, so that the recording layer is exposed to the light that has passed through the base, and the bar code blocks part of light emitted by the application of stimulating light, resulting in a reading error. Therefore, using both single-sided and double-sided stimulable phosphor sheets together requires two image information reading apparatus dedicated respectively for the single-sided stimulable phosphor sheets and the double-sided stimulable phosphor sheets. Those two image information reading apparatus result in a higher equipment cost and a greater installation space.

SUMMARY OF THE INVENTION

It is a general object of the present invention to provide a cassette for housing a stimulable phosphor sheet, which can reliably indicate ID information of the stimulable phosphor sheet housed therein and which is highly versatile.

A main object of the present invention is to provide an ID recognition structure for a cassette for housing a stimulable phosphor sheet, which can reliably recognize ID information of the a stimulable phosphor sheet housed in the cassette when the cassette is loaded into a cassette loading unit.

Another main object of the present invention is to provide an image information reading apparatus which is capable of reading recorded image information from stimulable phosphor sheets that include single-sided and double-sided stimulable phosphor sheets, is highly versatile, can be manufactured at a low cost, and can be installed in a small space.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
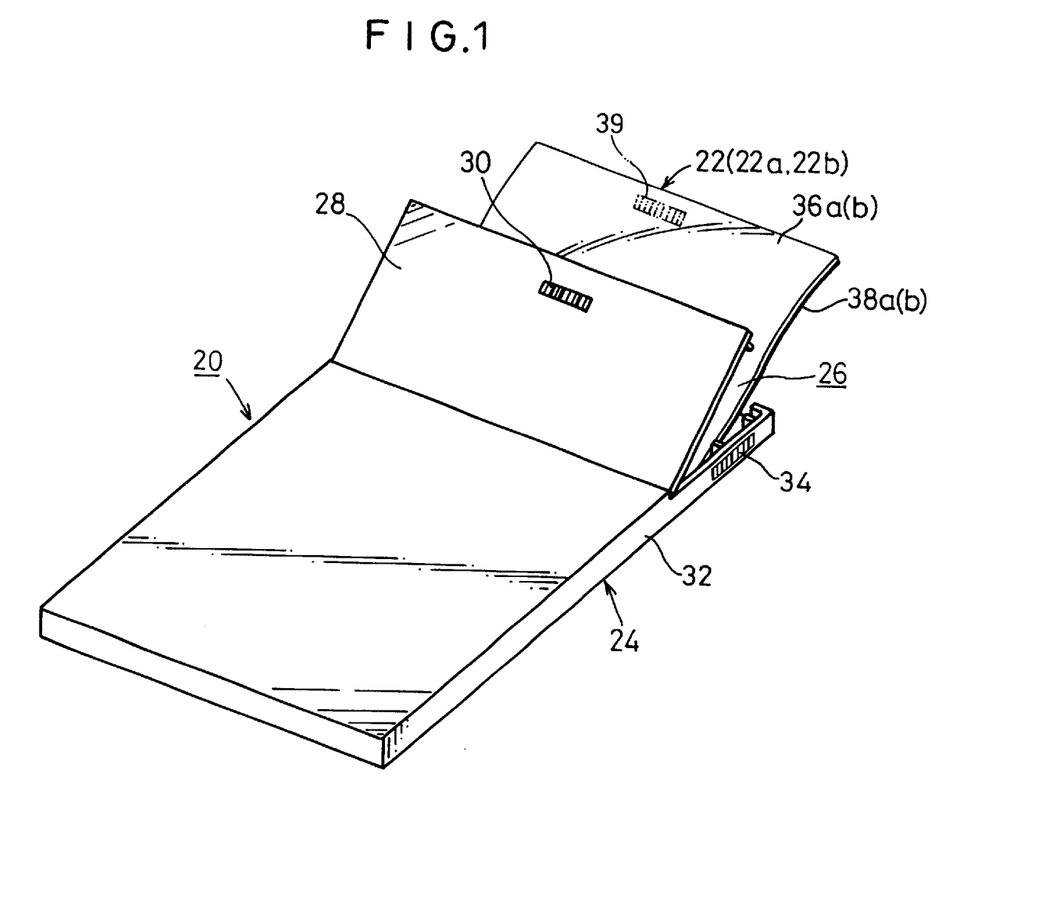
FIG. 1 is a perspective view of a cassette for housing a stimulable phosphor sheet according to a first embodiment of the present invention.
Figure 2:
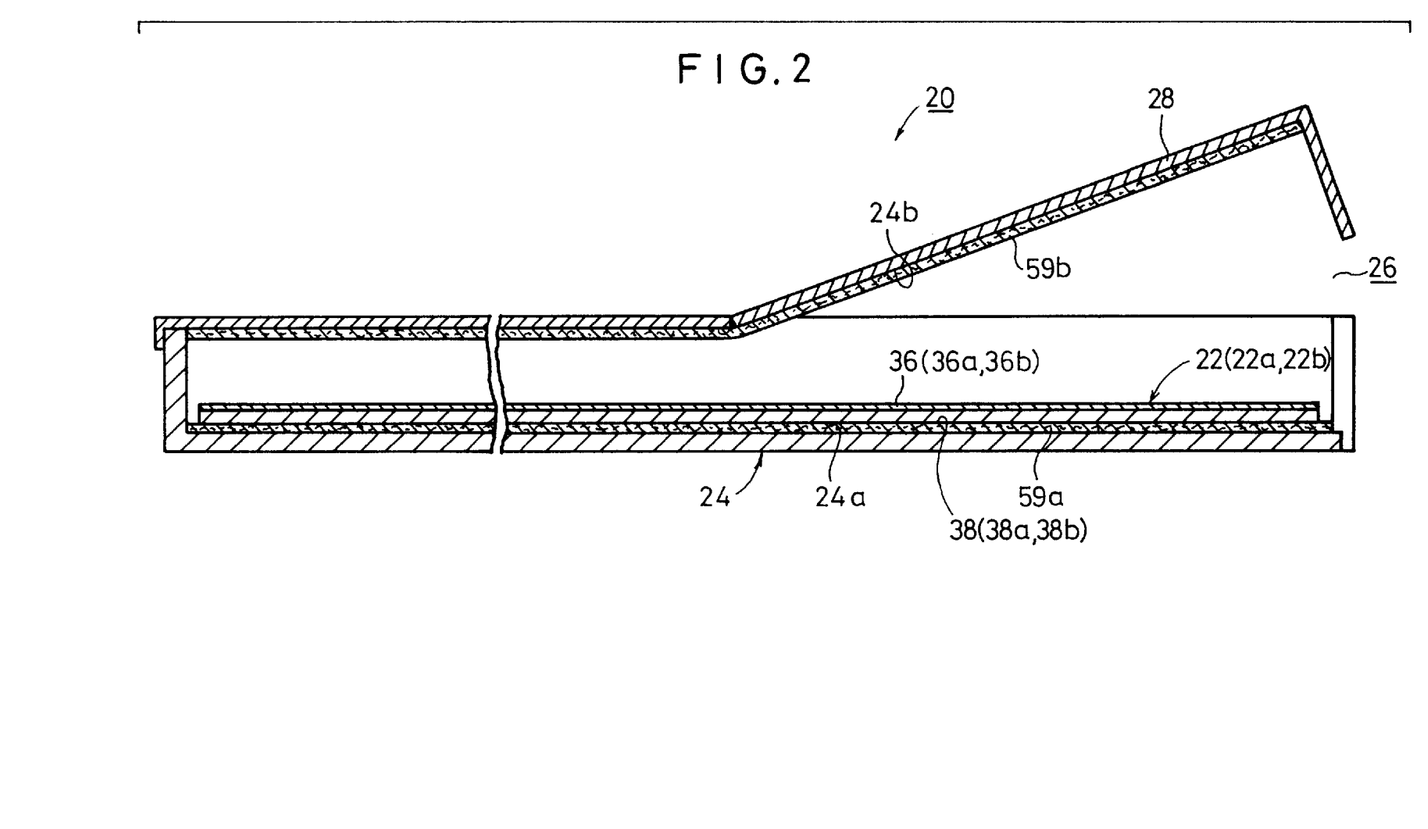
FIG. 2 is a longitudinal cross-sectional view of the cassette.

FIG. 1 shows in perspective a cassette 20 for housing a stimulable phosphor sheet according to a first embodiment of the present invention, and FIG. 2 is a longitudinal cross-sectional view of the cassette 20.

As shown in FIGS. 1 and 2, the cassette 20 comprises a casing 24 for housing a stimulable phosphor sheet 22, and a lid 28 by which an opening 26 in the casing 24 is openably closed. The lid 28 supports a first bar code (first ID indicating means) 30 applied to a substantially central portion thereof in its transverse direction, the first bar code 30 representing recorded identification information of the cassette 20. A second bar code (second ID indicating means) 34 representing recorded identification information of the cassette 20 is applied to a positioning reference surface 32 of the casing 24 at a forward position thereon in the direction in which the cassette 20 is loaded.

There are cassettes 20 of various sets of dimensions depending on the dimensions of the stimulable phosphor sheets 22 housed therein. When cassettes 20 are loaded into respective cassette loading regions 62a through 62d (described later on), the positioning reference surface 32 on one side of the casing 24 of each cassette 20 is always used as a reference surface. Specifically, cassettes 20 of different sets of dimensions have their positioning reference surfaces 32 placed in the same position at all times when they are loaded into the cassette loading regions 62a through 62d. The second bar code 34 is applied to the positioning reference surface 32 at a certain fixed position thereon.

The stimulable phosphor sheet 22 may be either a single-sided sheet 22a comprising a recording layer (phosphor layer) 38a disposed on an opaque base 36a for emitting light from the recording layer 38a upon exposure to stimulating light, or a double-sided sheet 22b comprising a recording layer (phosphor layer) 38b disposed on a transparent base 36b for emitting light from both surfaces upon exposure to stimulating light. The second bar code 34 also represents identification information indicating whether the stimulable phosphor sheet 22 housed in the cassette 20 is the single-sided sheet 22a or the double-sided sheet 22b. The single-sided sheet 22a further has a third bar code 39 applied to the base 36a.

Figure 3:
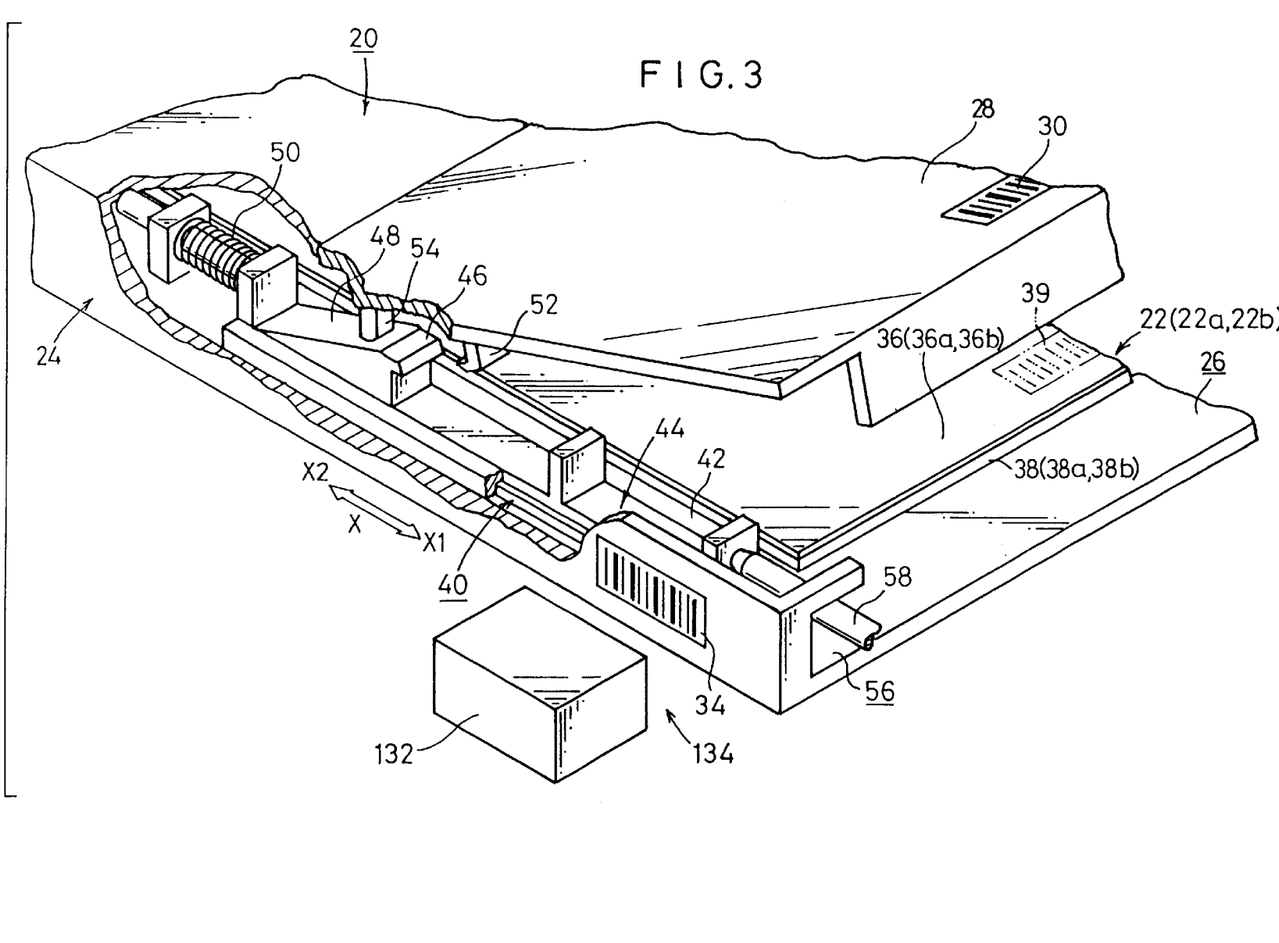
FIG. 3 is a fragmentary perspective view of a lock means of the cassette.

As shown in FIG. 3, the cassette 20 has a lock means 40 for locking the lid 28 in a closed position on the casing 24. The lock means 40 has a slider 44 disposed in the casing 24 and guided by a guide 42 for back-and-forth movement in the directions indicated by the arrow X. The slider 44 has a lock tooth 46 and a slanted surface 48 as its integral surfaces. The slider 44 is normally urged to move forwardly in the direction indicated by the arrow X1 by a compression spring 50 acting on an end of the slider 44 near the slanted surface 48. The lid 28 has a lock hook 52 projecting from an inner surface thereof for locking engagement with the lock finger 46 of the slider 44, and a finger 54 projecting from the inner surface thereof for engagement with the slanted surface 48 to open the lid 28. The casing 24 has a pin passage hole 56 defined in a front end wall thereof. Each of the cassette loading regions 62a through 62d has an unlock pin 58 fixed in position for being inserted through the pin passage hole 56 to push the slider 44 in the direction indicated by the arrow X2.

As shown in FIG. 2, the cassette 20 has inner wall surfaces including a bottom surface 24a facing the recording layer 38 (38a or 38b) of the stimulable phosphor sheet 22 and an upper surface 24b facing the base 36 (36a or 36b) of the stimulable phosphor sheet 22. Cushioning members 59a, 59b each in the form of a nonwoven fabric sheet or a fabric sheet are applied respectively to the bottom surface 24a and the upper surface 24b.

Figure 4:
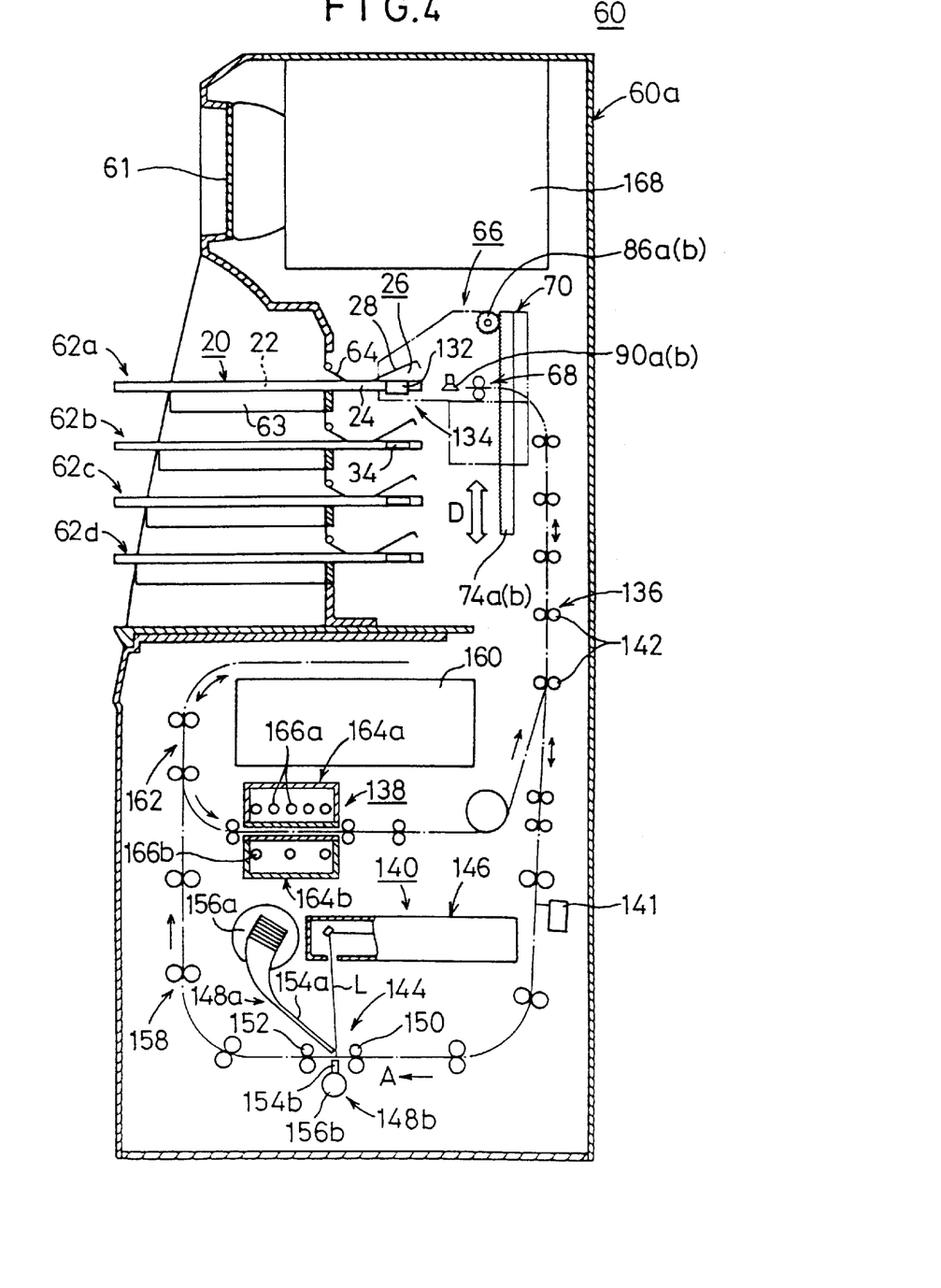
FIG. 4 is a schematic vertical cross-sectional view of an image information reading apparatus which incorporates an ID recognition structure according to the first embodiment of the present invention.

FIG. 4 schematically shows in vertical cross section an image information reading apparatus (loading apparatus) 60 in which the cassette 20 is loaded.

The image information reading apparatus 60 has an apparatus housing 60a including a front wall (control wall) which supports on its upper portion a touch panel 61 that functions as controls and a display monitor. The apparatus housing 60a accommodates therein a plurality of, e.g., four, cassette loading regions 62a through 62d for removably holding respective cassettes 20, disposed below the touch panel 61. Each of the cassette loading regions 62a through 62d has a support base 63 for placing the cassette 20 thereon and a shutter 64 openably and closably disposed for blocking light against entry into the apparatus housing 60a. A vertical sheet feeder 66 is vertically movably disposed behind the cassette loading regions 62a through 62d. The vertical sheet feeder 66 can selectively be aligned with any one of the cassette loading regions 62a through 62d for removing a stimulable phosphor sheet 22 from the cassette 20 in the corresponding one of the cassette loading regions 62a through 62d and returning a stimulable phosphor sheet 22 from which radiation image information is read and erased back into the cassette 20.

Figure 5:
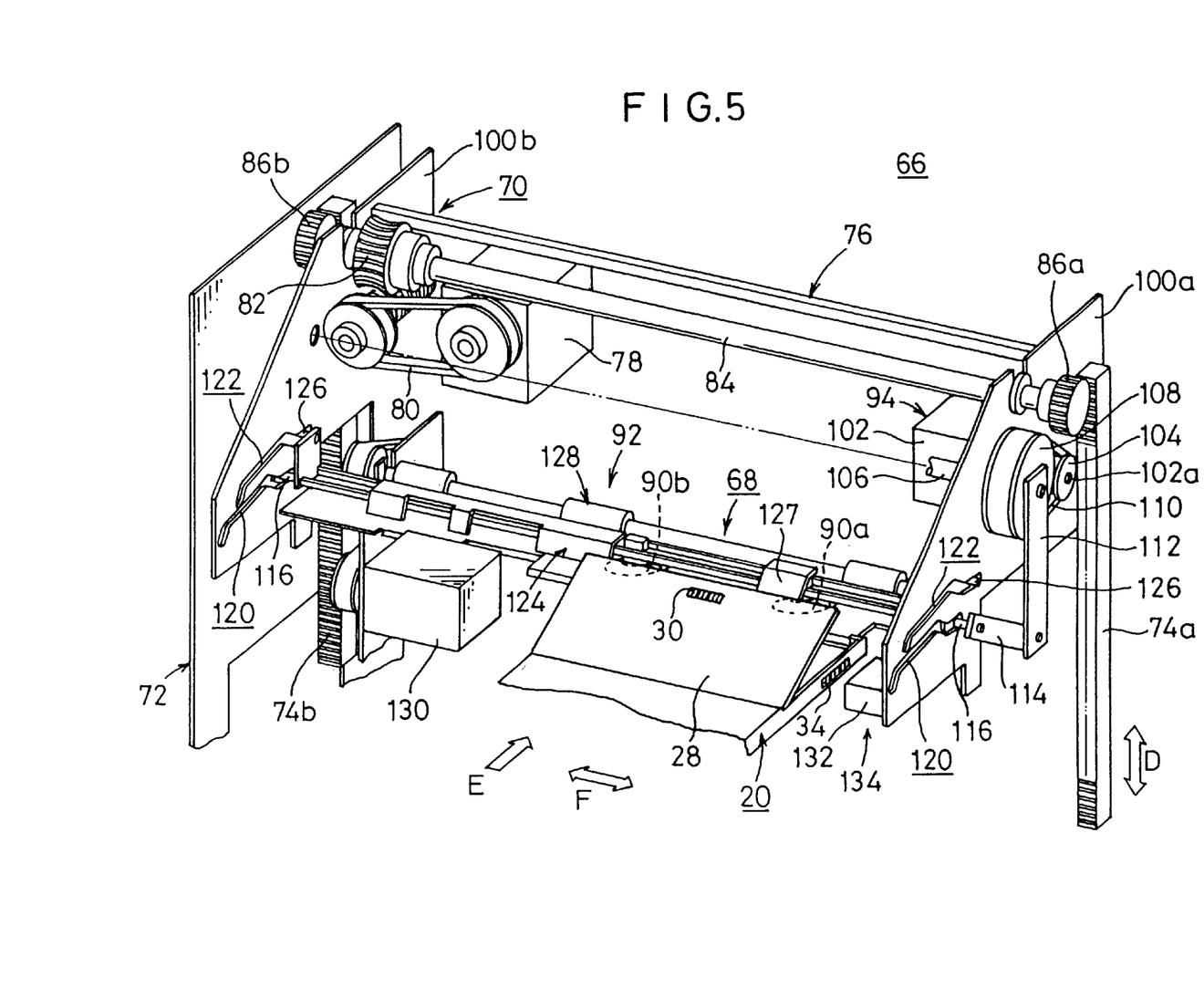
FIG. 5 is a fragmentary perspective view of a vertical sheet feeder of the image information reading apparatus.

As shown in FIG. 5, the vertical sheet feeder 66 comprises a sheet feeding mechanism 68 and a lifting and lowering mechanism 70 for vertically moving the sheet feeding mechanism 68 in the vertical directions indicated by the arrow D. The lifting and lowering mechanism 70 has a fixed frame 72 with a pair of vertical racks 74a, 74b fixed thereto. The lifting and lowering mechanism 70 also has a vertically movable frame 76 to which there is fixed a motor 78 that is operatively coupled to a gear assembly 82 by a belt and pulley means 80. The gear assembly 82 serves to transmit rotational forces from the motor 78 to a rotatable shaft 84 which supports on its opposite ends respective pinions 86a, 86b held in mesh with the respective racks 74a, 74b for holding the vertically movable frame 76 in a vertical position. The sheet feeding mechanism 68 is incorporated in the vertically movable frame 76.

The sheet feeding mechanism 68 has a pair of suction cups 90a, 90b movable into the cassette 20 with the lid 28 being open in one of the cassette loading regions 62a through 62d, and a moving means 94 for moving the suction cups 90a, 90b between the cassette 20 and a feeding means 92 for delivering the stimulable phosphor sheet 22 out of the cassette 20 to the feeding means 92 in the direction indicated by the arrow E.

Figure 6:
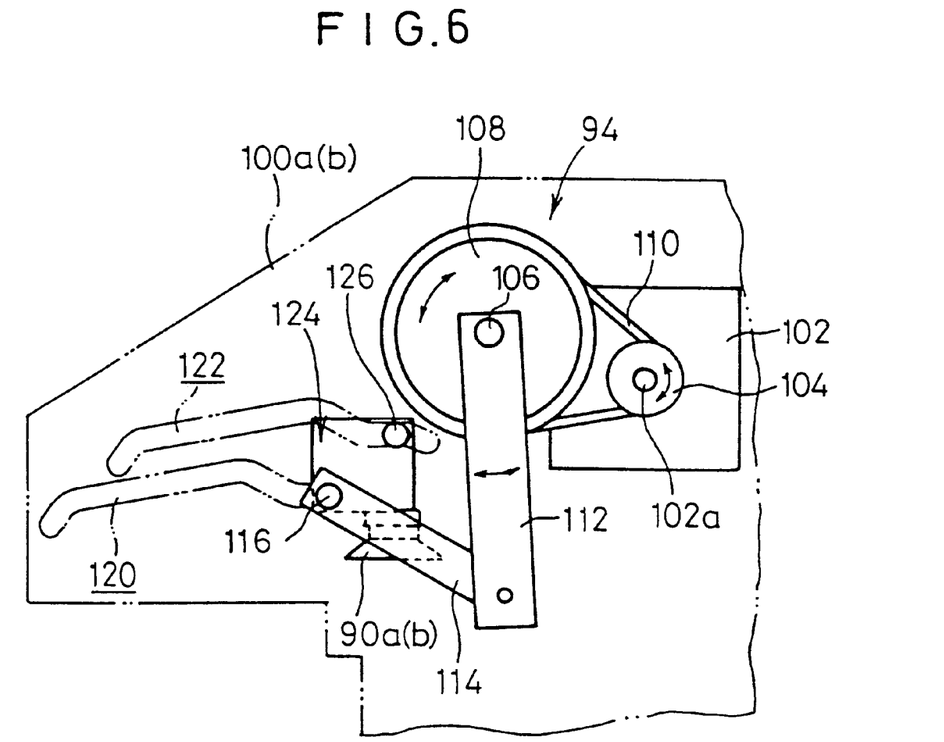
FIG. 6 is a fragmentary side elevational view of a sheet feeding mechanism of the image information reading apparatus.

The vertically movable frame 76 has a pair of side plates 100a, 100b spaced from each other by a certain distance in the direction indicated by the arrow F, which is perpendicular to the direction indicated by the arrow E. As shown in FIGS. 5 and 6, the moving means 94 has a first motor 102 fixedly mounted on the side plate 100a and having a drive shaft 102a to which a small-diameter pulley 104 is fixed. An endless belt 110 is trained around the small-diameter pulley 104 and a large-diameter pulley 108 which is fixed to an end of a drive shaft 106.

The drive shaft 106 is rotatably supported at its opposite ends on the side plates 100a, 100b. An arm 112 has an end secured to the large-diameter pulley 108 and an opposite end to which an end of a link 114 is swingably coupled. The link 114 has an opposite end supporting a first pivot shaft 116. An end of another arm 112 is secured directly to the other end of the drive shaft 106, and a link 114 with a first pivot shaft 116 is coupled to the other end of the other arm 112.

The side plates 100a, 100b each have two upper and lower guide grooves 120, 122 for moving the suction cups 90a, 90b along a path inclined obliquely downwardly toward the surface to be attracted of the stimulable phosphor sheet 22, which is opposite to the recording layer thereof. The guide grooves 120, 122 are shaped to provide the path for the suction cups 90a, 90b. A movable frame 124 has opposite ends to which the first pivot shafts 116 and second pivot shafts 126 are fixed, the first pivot shafts 116 being inserted in the respective guide grooves 120 and the second pivot shafts 126 in the respective guide grooves 122.

On the movable frame 124, there is mounted a guide plate 127 for forcibly opening the lid 28 of the cassette 20. The suction cups 90a, 90b are mounted on the movable frame 124 and spaced from each other by a distance corresponding to the dimension of a smallest stimulable phosphor sheet 22 in the direction indicated by the arrow F. The feeding means 92 comprises a plurality of roller pairs 128 and a second motor 130 for rotating the roller pairs 128 in unison with each other.

All stimulable phosphor sheets 22 of different sets of dimensions that are introduced into the image information reading apparatus 60 are placed in relation to a reference position close to the side plate 100a. Specifically, the reference surfaces 32 of any cassettes 20 that store stimulable phosphor sheets 22 are horizontally spaced a certain distance from the side plate 100a at all times. On the side plate 100a, there is mounted a reading means 132 for reading the second bar code 34, in horizontal alignment with the second bar code 34 on the reference surface 32 of the cassette 20 placed in any one of the cassette loading regions 62a through 62d which is being operated upon by the vertical sheet feeder 66. The second bar code 34 and the reading means 132 jointly make up an ID recognition structure (sheet identifying assembly) 134. Since the second bar code 34 is used as an identification medium, the reading means 132 comprises a bar-code reader.

As shown in FIG. 4, the image information reading apparatus 60 also has an erasure unit 138 and a reading unit 140 which are disposed in the apparatus housing 60a below the vertical sheet feeder 66 and connected to the vertical sheet feeder 66 through a feed system 136. The feed system 136 comprises a plurality of roller pairs 142 which jointly make up a vertical feed path extending downwardly from the vertical sheet feeder 66 and a horizontal feed path extending horizontally from the lower end of the vertical feed path. A bar-code reader 141 is positioned near the lower end of the vertical feed path for reading the third bar code 39 applied to the single-sided stimulable phosphor sheet 22a. The reading unit 140 is disposed above the horizontal feed path.

The reading unit 140 comprises an auxiliary scanning feeding mechanism 144 for delivering a stimulable phosphor sheet 22 from a cassette 20 in an auxiliary scanning direction indicated by the arrow A, an optical system 146 for applying a laser beam L as it is deflected in a main scanning direction (substantially perpendicular to the auxiliary scanning direction) to the stimulable phosphor sheet 22 as it is delivered in the auxiliary canning direction, and first and second light guiding systems (light guiding means) 148a, 148b for photoelectrically reading light which is emitted from the stimulable phosphor sheet 22 when the stimulable phosphor sheet 22 is exposed to the laser beam L.

The auxiliary scanning feeding mechanism 144 has first and second roller pairs 150, 152 rotatable in synchronism with each other. Each of the first and second roller pairs 150, 152 has a pair of rollers that can be moved toward and away from each other. The first light guiding system 148a comprises a first light guide 154a extending along a main scanning line on the recording layer of the stimulable phosphor sheet 22 where the laser beam L is applied, and a first photomultiplier 156a mounted on an upper end of the first light guide 154a. The second light guiding system 148b, which is disposed on the reverse side of the stimulable phosphor sheet 22, comprises a second light guide 154b extending along a main scanning line on the reverse side of the stimulable phosphor sheet 22, and a second photomultiplier 156b mounted on an end of the second light guide 154b.

A sheet feeder 158 for upwardly feeding the stimulable phosphor sheet 22 from which radiation image information has been read by the reading unit 140 is disposed downstream of the reading unit 140 in the direction of travel of the stimulable phosphor sheet 22 through the reading unit 140. When the stimulable phosphor sheet 22 is fed from the reading unit 140 upwardly by the sheet feeder 158, the leading end of the stimulable phosphor sheet 22 is guided horizontally over a power supply 160 above the erasure unit 138 via an erasing unit feeder 162 disposed near the power supply 160. The erasing unit feeder 162 then feeds back the stimulable phosphor sheet 22, whose leading end has been fed over the power supply 162, horizontally from the left to the right into the erasure unit 138.

The erasure unit 138 comprises a first erasing unit 164a disposed on one side of the feed path of the erasing unit feeder 162, i.e., on the side of the recording layer 38 of the stimulable phosphor sheet 22, and a second erasing unit 164b disposed on the other side of the feed path of the erasing unit feeder 162, i.e., on the side of the base 36 (reverse side) of the stimulable phosphor sheet 22. The first and second erasing units 164a, 164b comprise respective horizontal arrays of erasing light sources 166a, 166b. The erasing unit feeder 162 extends horizontally through the erasure unit 138 and then upwardly obliquely, and is connected to the feed system 136.

A controller (control means) 168 is disposed in an upper end portion of the apparatus housing 60a, for controlling the image information reading apparatus 60 in its entirety.

According to the first embodiment of the present invention, the controller 168 is supplied with an identification signal (cassette identification signal) from the reading means 132 of the ID recognition structure 134, and functions to search for (cite) pre-registered patient information, recording information, etc., determine whether the stimulable phosphor sheet 22 in a cassette 20 is a single-sided sheet 22a or a double-sided sheet 22b, and control the turning on/off of the second light guiding system 148b and the second erasing unit 164b.

Operation of the image information reading apparatus 60 in relation to cassettes 20 will be described below.

A cassette 20 which stores a stimulable phosphor sheet 22 which carries radiation image information of a subject such as a human body recorded by an exposure device (not shown) is introduced into the apparatus housing 60a along the support base 63 of the cassette loading region 62a, for example. As the cassette 20 is introduced, the leading end of the cassette 20 pushes open the shutter 64, and enters the interior space of the apparatus housing 60a. The first bar code 30 applied to the cassette 20 is used when the user registers ID information.

As shown in FIG. 3, when the cassette 20 is inserted in the direction indicated by the arrow X1, the unlock pin 58 passes through the pin passage hole 56 in the casing 24 and pushes the slider 44 relatively in the direction indicated by the arrow X2. The slider 44 moves in the direction indicated by the arrow X2, causing the lock tooth 46 to disengage from the lock hook 52 of the lid 28 for thereby unlocking the lid 28. Upon further movement of the slider 44 in the direction indicated by the arrow X2, the slanted surface 48 of the slider 44 slidingly engages the finger 54 of the lid 28, opening the lid 28 to a certain angular position.

Similarly, other cassettes 20 are loaded respectively into the remaining cassette loading regions 62b through 62d. Thereafter, the lifting and lowering mechanism 70 of the vertical sheet feeder 66 is operated to lift or lower the sheet feeding mechanism 68 into horizontal alignment with the cassette loading region 62a, for example. More specifically, as shown in FIG. 5, the motor 78 mounted on the vertically movable frame 76 is energized to cause the belt and pulley means 80 and the gear assembly 82 to rotate the rotatable shaft 84 about its own axis in one direction. The pinions 86a, 86b mounted on the respective opposite ends of the rotatable shaft 84 in mesh with the racks 74a, 74b move in one of the directions indicated by the arrow D, i.e., either upwardly or downwardly, to bring the sheet feeding mechanism 68 mounted on the vertically movable frame 76 into horizontal alignment with the cassette loading region 62a.

At this time, the side plate 100a that moves vertically in unison with the vertically movable frame 76 is horizontally aligned with the cassette loading region 62a, and the reading means 132 mounted on the side plate 100a is positioned in horizontal alignment with the second bar code 34 applied to the reference surface 32 of the cassette 20 loaded in the cassette loading region 62a. When the reading means 132 reads the second bar code 34, the controller 168 determines whether the stimulable phosphor sheet 22 in the cassette 20 is a single-sided sheet 22a or a double-sided sheet 22b, and searches for patient information, recording information, etc. from the read bar-code number. If the stimulable phosphor sheet 22 in the cassette 20 is a single-sided sheet 22a, then the controller 168 turns off the second light guiding system 148b of the reading unit 140 and the second erasing unit 164b of the erasure unit 138.

Then, the moving means 94 is actuated to displace the suction cups 90a, 90b into the cassette 20. Specifically, when the first motor 102 is energized, the small-diameter pulley 104 is rotated to cause the belt 110 to rotate the large-diameter pulley 108 and the drive shaft 106 in unison with each other in one direction. The arms 112 fixed to the large-diameter pulley 108 and the opposite end of the drive shaft 106 are angularly moved about the axis of the drive shaft 106. Since the first pivot shafts 116 are connected to the arms 112 by the links 114, and the first and second pivot shafts 116, 126 are mounted on the movable frame 124, the first and second pivot shafts 116, 126 move along the guide grooves 120, 122. The movable frame 124 displaces the suction cups 90a, 90b along the path inclined obliquely downwardly toward the base 36a of the single-sided stimulable phosphor sheet 22a in the cassette 20. When the movable frame 124 moves toward the cassette 20, the guide plate 127 mounted on the movable frame 124 enters the cassette 20 for further angularly moving the lid 28 to an angular position to allow the suction cups 90a, 90b to find their way into the cassette 20.

Then, the suction cups 90a, 90b attract and hold the base 36a of the single-sided sheet 22a, and the first motor 102 of the moving means 94 is reversed to turn the arms 112 to move the suction cups 90a, 90b in unison with the movable frame 124 from the cassette 20 toward the feeding means 92. The single-sided sheet 22a attracted by the suction cups 90a, 90b is now removed from the cassette 20 through the opening 26 thereof.

The leading end of the single-sided sheet 22a is then gripped by the roller pairs 128 of the feeding means 92. Since the roller pairs 128 have been rotated at a certain speed by the second motor 130, the single-sided sheet 22a is released from the suction cups 90a, 90b substantially at the same time that the leading end of the single-sided sheet 22a is gripped by the roller pairs 128. The single-sided sheet 22a is transferred from the roller pairs 128 to the feed system 136, and then fed downwardly by the roller pairs 142 of the feed system 136.

When the third bar code 39 applied to the base 36a of the single-sided sheet 22a passes across the bar-code reader 141, the third bar code 39 is read by the bar-code reader 141. After the patient information, recording information, etc. corresponding to the single-sided sheet 22a is searched for, the single-sided sheet 22a is sent to the reading unit 140.

As shown in FIG. 4, in the reading unit 140, while the single-sided sheet 22a is being fed in the auxiliary scanning direction indicated by the arrow A by the first and second roller pairs 150, 152 of the auxiliary scanning feeding mechanism 144, the laser beam L emitted from the optical system 146 is applied to the recording layer 38a of the single-sided sheet 22a. Radiation image information stored in the single-sided sheet 22a is now photoelectrically read by the first light guiding system 148a.

After the stored radiation image information has been read, the single-sided sheet 22a is fed vertically upwardly by the sheet feeder 158, and transferred from the sheet feeder 158 to the erasing unit feeder 162 with the leading end being guided horizontally above the power supply 160. In the erasing unit feeder 162, the single-sided sheet 22a is fed horizontally with its trailing end as fed by the sheet feeder 158 serving as the leading end. The first erasing unit 164a of the erasure unit 138 erases remaining radiation image information from the single-sided sheet 22a with the erasing light sources 166a. Thereafter, the single-sided sheet 22a is fed to the feed system 136, and then fed upwardly by the feed system 136, after which the single-sided sheet 22a is sent back into the empty cassette 20 in the cassette loading region 62a by the vertical sheet feeder 66.

When the first stimulable phosphor sheet 22 (the single-sided sheet 22a in the above description) is delivered to a position immediately before the reading unit 140, the vertical sheet feeder 66 moves vertically to a position for removing the stimulable phosphor sheet 22 from the cassette 20 that is loaded in the cassette loading region 62b, for example. Therefore, a plurality of stimulable phosphor sheets 22 are simultaneously processed differently in the apparatus housing 60a.

If the stimulable phosphor sheet 22 stored in the cassette 20 is a double-sided sheet 22b, then the controller 168 turns on the first and second light guiding systems 148a, 148b and also turns on the erasing light sources 166a, 166b of the respective first and second erasing units 164a, 164b. The controller 168 turns off the bar-code reader 141.

After the double-sided sheet 22b is removed from the cassette 20 and delivered to the feed system 136 by the sheet feeding mechanism 68, the double-sided sheet 22b is fed to the reading unit 140 by the roller pairs 142 of the feed system 136. In the reading unit 140, while the double-sided sheet 22b is being fed in the auxiliary scanning direction indicated by the arrow A by the auxiliary scanning feeding mechanism 144, the laser beam L emitted from the optical system 146 is applied to the recording layer 38b of the double-sided sheet 22b.

Light emitted from the recording layer 38b of the double-sided sheet 22b is now photoelectrically read by the first light guiding system 148a. At the same time, light emitted from the reverse side of the double-sided sheet 22b via the transparent base 36b is also photoelectrically read by the second light guiding system 148b. Therefore, the recorded radiation image information can be read with higher accuracy. Use of the double-sided sheet 22b is thus effective in various applications, e.g., mammography, which require a high image quality level.

After the stored radiation image information has been read, the double-sided sheet 22b is switched back by the erasing unit feeder 162, and fed horizontally between the first and second erasing units 164a, 164b of the erasure unit 138. At this time, the erasing light sources 166a, 166b of the first and second erasing units 164a, 164b apply erasing light to the both surfaces of the double-sided sheet 22b thereby to remove remaining radiation image information from the double-sided sheet 22b. Thereafter, the double-sided sheet 22b is fed to the feed system 136, and then fed upwardly by the feed system 136, after which the double-sided sheet 22b is sent back into the empty cassette 20 in the cassette loading region 62b by the vertical sheet feeder 66.

In the first embodiment, as described above, the second bar code 34 as an identification medium is applied to the reference surface 32 of the cassette 20, and the reading means 132 for reading the second bar code 34 is incorporated in the vertical sheet feeder 66. Therefore, the image information reading apparatus 60 is capable of reliably recognizing whether the stimulable phosphor sheet 22 in the cassette 20 is a single-sided sheet 22a or a double-sided sheet 22b. If the stimulable phosphor sheet 22 is recognized as a single-sided sheet 22a, then the second light guiding system 148b and the second erasing unit 164b are turned off. If the stimulable phosphor sheet 22 is recognized as a double-sided sheet 22b, then the second light guiding system 148b and the second erasing unit 164b are turned on and the bar-code reader 141 is turned off.

According to the first embodiment, therefore, the image information reading apparatus 60 is capable of reliably distinguishing between a double-sided sheet 22b to which bar codes cannot directly be applied and a single-sided sheet 22a which is usually used, and well reading radiation image information from those single-sided and double-sided sheets 22a, 22b.

In the first embodiment, furthermore, the second bar code 34 as a second ID indicating means is applied to the reference surface 32 which is used for positioning the cassette 20 when it is loaded. When various cassettes 20 of different dimensions are used, they are loaded in the respective cassette loading regions 62a through 62d, and the second bar codes 34 applied to the reference surfaces 32 of the cassettes 20 are located in a constant position at all times, i.e., in a position that can be aligned with the reading means 132. Consequently, ID information corresponding to stimulable phosphor sheets 22 housed in variously dimensioned cassettes 20 can reliably be searched for.

The first bar code 30 is applied to the substantially central portion of the lid 28 in its transverse direction cannot. If the cassette 20 has different dimensions, then since the position of the first bar code 30 from the reference surface 32 differs, the first bar code 30 cannot accurately be read in the image information reading apparatus 60. Therefore, the first bar code 30 is normally used when the user registers ID information.

As shown in FIG. 2, in the cassette 20, the cushioning members 59a, 59b each in the form of a nonwoven fabric sheet or a fabric sheet are applied respectively to the bottom surface 24a and the upper surface 24b which are contacted by the recording layer 38 and the base 36, respectively, of the stimulable phosphor sheet 22. Therefore, the recording layer 38 and the base 36 of the stimulable phosphor sheet 22 in the cassette 20 are prevented from being damaged by the cassette 20, and hence no worn-off particles are produced and carried into the image information reading apparatus 60.

If the transparent base 36b of the double-sided sheet 22b suffered scratches or defects, they would make it difficult to collect light emitted from the base 36b, resulting in a failure to produce a high-quality reproduced image.

According to the present invention, the cushioning member 59b for protecting the base 36b is effective to prevent the base 36b from being damaged as much as possible.

In the first embodiment, the same image information reading apparatus 60 is capable of effectively processing both a single-sided sheet 22a and a double-sided sheet 22b which have heretofore been processed to read recorded radiation image information by two dedicated image information reading apparatus. Inasmuch as the image information reading apparatus 60 operates as a shared machine, the equipment cost and the installation space can greatly be reduced. Single-sided sheets 22a are used for recording radiation image information of ordinary subjects, and double-sided sheets 22b are used for recording radiation image information of subjects which require a high image quality level, e.g., according to mammography, for example. Because these different types of stimulable phosphor sheets 22 can be processed by the same image information reading apparatus 60, the versatility of the image information reading apparatus 60 is highly increased.

In the first embodiment, the second bar code 34 is applied to all cassettes 20 and represents information for distinguishing between a single-sided sheet 22a and a double-sided sheet 22b. However, the second bar code 34 may be applied to only those cassettes 20 which store double-sided sheets 22b. When the reading means 132 detects the second bar code 34 on a cassette 20, it is determined that a double-sided sheet 22b is stored in the cassette 20. When the reading means 132 does not detect the second bar code 34 on a cassette 20, it is determined that no double-sided sheet 22b is stored in the cassette 20. If the third bar code 39 is applied to the base 36a of a single-sided sheet 22a, then the third bar code 39 is read by the bar-code reader 141, so that ID information of the single-sided sheet 22a can reliably be obtained.

The ID recognition structure (sheet identifying assembly) 134 may comprise a thickness detecting means associated with either one of the roller pairs 142 of the feed system 136, and the single-sided sheet 22a and the double-sided sheet 22b may have different thicknesses. When the thickness detecting means detects the difference between the thicknesses of the single-sided sheet 22a and the double-sided sheet 22b, it is possible to distinguish reliably between the single-sided sheet 22a and the double-sided sheet 22b, so that radiation image information can be read from the single-sided sheet 22a and the double-sided sheet 22b efficiently and highly accurately in a manner suitable for those different types of sheets.

In the first embodiment, the first erasing unit 164a is positioned on the side of the recording layer of the stimulable phosphor sheet 22, and the second erasing unit 164b is positioned on the reverse side of the stimulable phosphor sheet 22. However, only the first erasing unit 164a may be used to erase remaining radiation image information from the stimulable phosphor sheet 22.

Figure 7:
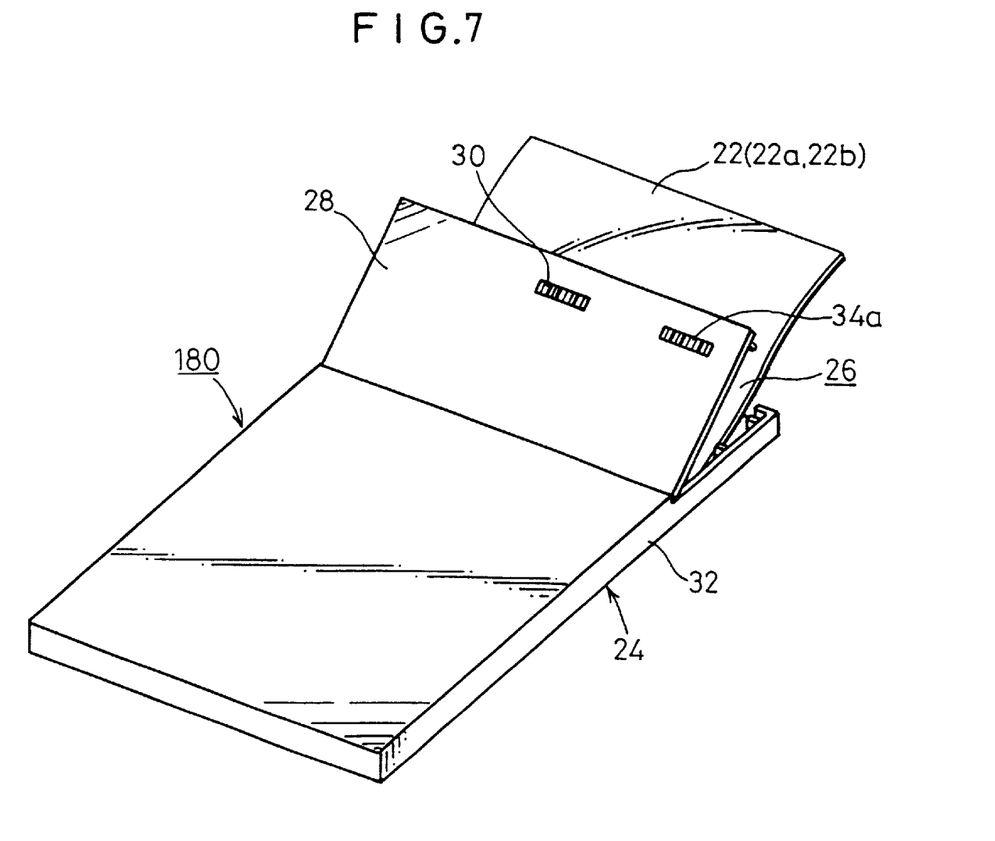
FIG. 7 is a perspective view of a cassette for housing a stimulable phosphor sheet according to a second embodiment of the present invention.

FIG. 7 shows in perspective a cassette 180 for housing a stimulable phosphor sheet according to a second embodiment of the present invention. Those parts of the cassette 180 which are identical to those of the cassette 20 according to the first embodiment are denoted by identical reference characters, and will not be described in detail below.

As shown in FIG. 7, the cassette 180 has, in addition to the first bar code 30, a second bar code 34a applied to the lid 28 at a position spaced a certain distance from the reference surface 32 in the transverse direction of the cassette 180. The second bar code 34a is always located at a constant position spaced from the reference surface 32. The distance between the reference surface 32 and the second bar code 34a remains constant on various cassettes 20 having different sets of dimensions.

The apparatus housing 60a has a reading means (not shown) for reading the second bar code 34a, the reading means comprising a bar-code reader mounted on the sheet feeding mechanism 68. When the stimulable phosphor sheet 22 in the cassette 180 is attracted by the suction cups 90a, 90b of the sheet feeding mechanism 68, the non-illustrated reading means reads the second bar code 34a on the lid 28 to determine whether the stimulable phosphor sheet 22 is a single-sided sheet 22a or a double-sided sheet 22b. Accordingly, a process of distinguishing between a single-sided sheet 22a and a double-sided sheet 22b can reliably be performed by a relatively simple arrangement, as with the first embodiment.

Figure 8:
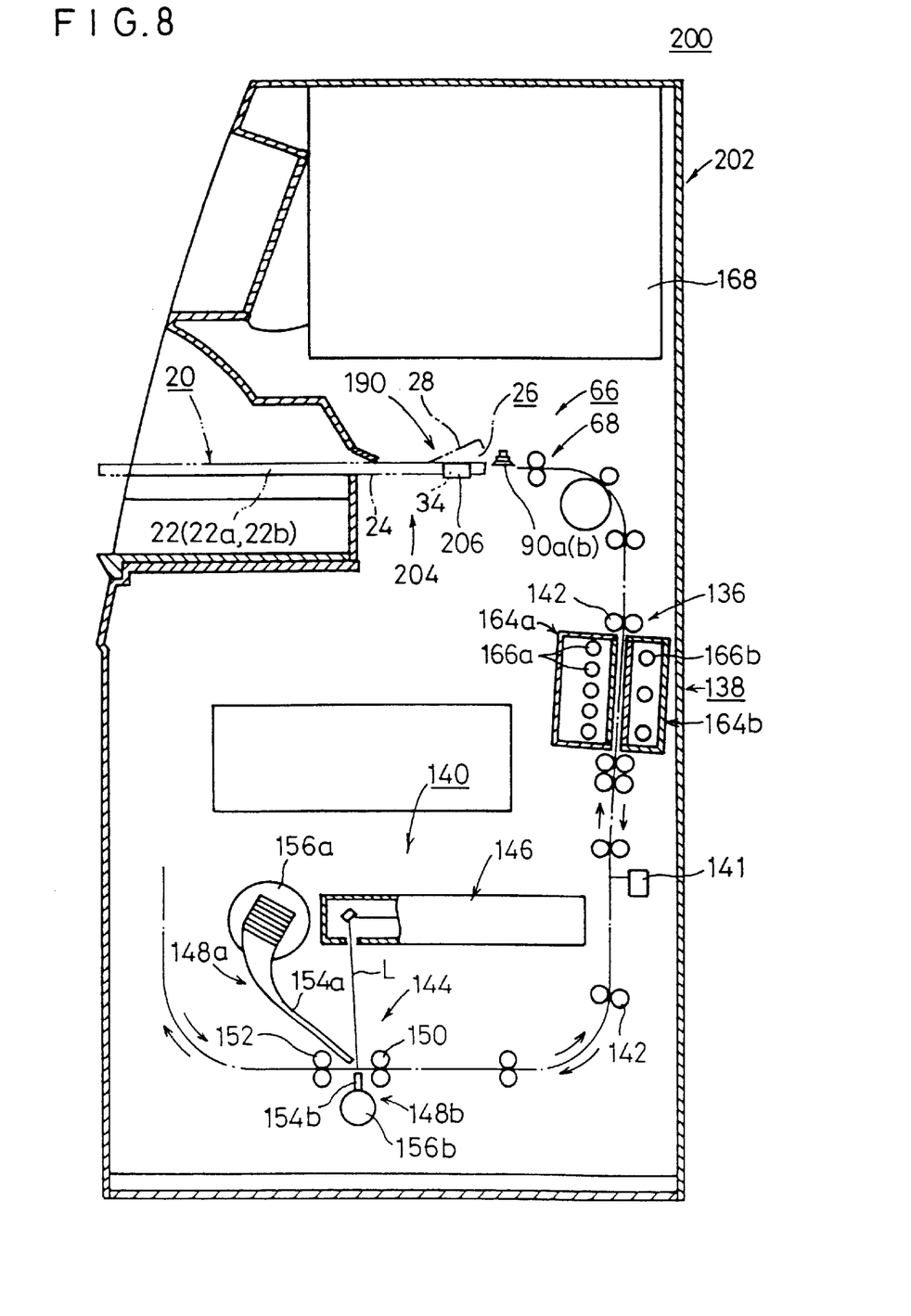
FIG. 8 is a schematic vertical cross-sectional view of an image information reading apparatus which incorporates an ID recognition structure according to a third embodiment of the present invention.

FIG. 8 schematically shows an image information reading apparatus (loading apparatus) 200 which incorporates an ID recognition structure (sheet identifying assembly) 190 according to a third embodiment of the present invention. Those parts of the ID recognition structure 190 and the image information reading apparatus 200 which are identical to those of the ID recognition structure 134 and the image information reading apparatus 60 according to the first embodiment are denoted by identical reference characters, and will not be described in detail below.

As shown in FIG. 8, the image information reading apparatus 200 has an apparatus housing 202 which accommodates a cassette loading region 204 for loading a single cassette 20 in a front wall (control wall) of the apparatus housing 202. The cassette loading region 204 includes a reading means 206 for reading the second bar code 34 applied to the reference surface 32 of the cassette 20, the reading means 206 being horizontally aligned with the second bar code 34. The reading means 206 and the second bar code 34 jointly make up an ID recognition structure 190.

When the cassette 20 is loaded into the cassette loading region 204, the second bar code 34 on the cassette 20 is positioned in horizontal alignment with the reading means 206, which determines whether a single-sided sheet 22a or a double-sided sheet 22b is housed in the cassette 20. Therefore, the reading unit 140 is able to well read recorded radiation image information from both a single-sided sheet 22a and a double-sided sheet 22b, and the erasure unit 138 is capable of reliably erasing remaining radiation image information from the single-sided sheet 22a and the double-sided sheet 22b.

The single image information reading apparatus 200 can thus reliably process the single-sided sheet 22a and the double-sided sheet 22b as desired. The single image information reading apparatus 200 is therefore highly versatile, and requires a reduced equipment cost and a reduced installation space, as with the first embodiment.

Figure 9:
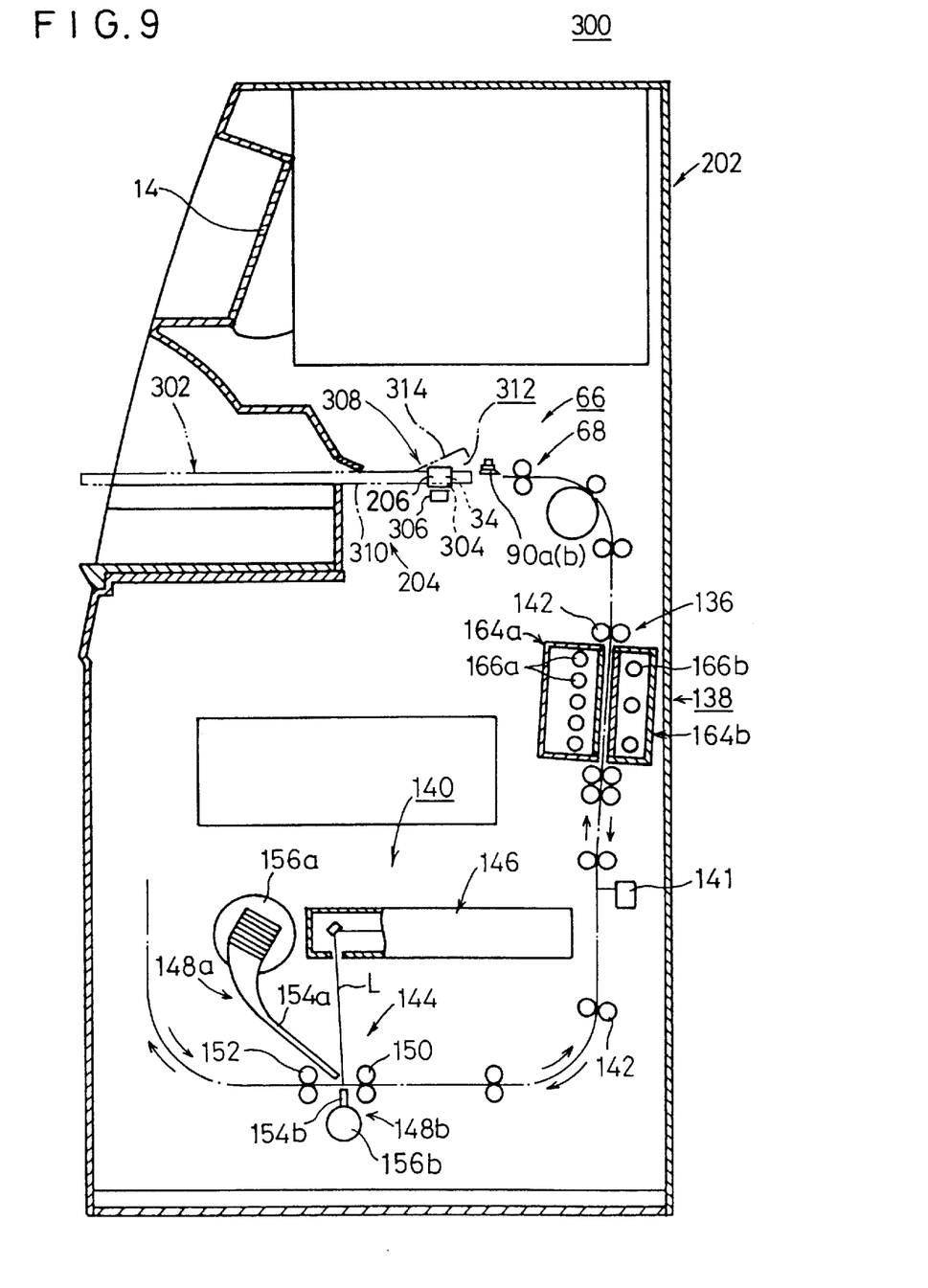
FIG. 9 is a schematic vertical cross-sectional view of an image information reading apparatus according to a fourth embodiment of the present invention.

FIG. 9 schematically shows an image information reading apparatus (loading apparatus) 300 according to a fourth embodiment of the present invention. Those parts of the image information reading apparatus 300 which are identical to those of the image information reading apparatus 200 according to the second embodiment are denoted by identical reference characters, and will not be described in detail below.

As shown in FIG. 9, the cassette loading region 204 has a reading means 306 aligned with a sheet magnet 304 as an identification medium applied to a cassette 302 which houses a double-sided sheet 22b. Further, the cassette loading region 204 has the reading means 206 aligned with the second bar code 34. The reading means 306 and the sheet magnet 304 jointly make up a sheet identifying assembly 308.

Figure 10:
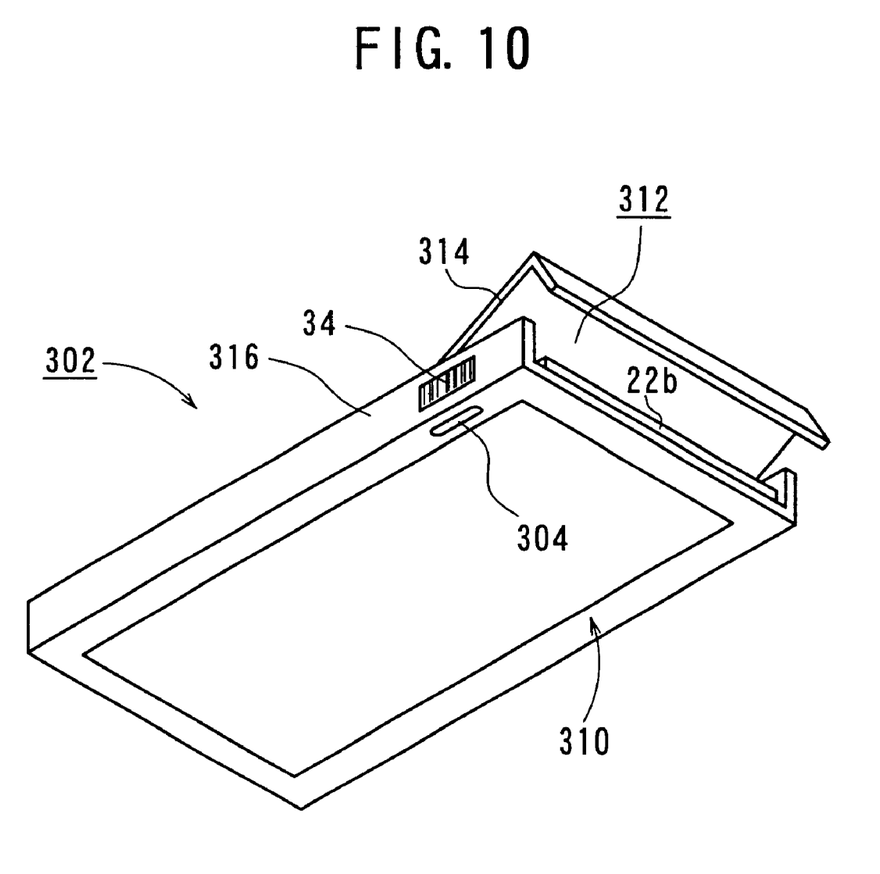
FIG. 10 is a perspective view of a cassette having a sheet magnet attached to a bottom thereof.

As shown in FIG. 10, the cassette 302 comprises a casing 310 for housing a double-sided sheet 22b, and a lid 314 by which an opening 312 in the casing 310 is openably closed. The casing 310 supports the sheet magnet 304 on a leading end thereof in the direction in which the cassette 302 is loaded, the sheet magnet 304 being embedded so as to lie substantially flush with the reverse side of the casing 310. The sheet magnet 304 is positioned adjacent to the second bar code 34 applied to a positioning reference surface 316 of the casing 310.

The reading means 306 is positioned in vertical alignment with the sheet magnet 304 when the cassette 302 is loaded in the cassette loading region 204. The reading means 306 comprises a magnet sensor for magnetically detecting whether there is the sheet magnet 304 or not.

When the cassette 302 housing the double-sided sheet 22b is loaded into the cassette loading region 204, the sheet magnet 304 embedded in the casing 310 of the cassette 302 is positioned in vertical alignment with the reading means 306, which detects the sheet magnet 304. Therefore, it is possible to determine that the double-sided sheet 22b is housed in the cassette 302. At this time, the reading means 206 reads the second bar code 34 so as to obtain ID information such as patient information and recording information, etc.

When a cassette 18 housing a single-sided sheet 22a is loaded into the cassette loading region 204, the reading means 306 does not detect any sheet magnet, and determines that the single-sided sheet 22a is housed in the cassette 302.

According to the fourth embodiment, therefore, it is possible to reliably determine which of the single-sided sheet 22a and the double-sided sheet 22b is loaded in the apparatus housing 202. The single image information reading apparatus 300 can thus reliably process the single-sided sheet 22a and the double-sided sheet 22b as desired, as with the first and second embodiments.

The sheet magnet 304 may be applied to the reference surface 316 of the casing 310 of the cassette 302, and the reading means 306 may be positioned in horizontal alignment with the reference surface 316, with the sheet magnet 304 being positioned on the leading end of the casing 310 in the direction in which it is inserted into the cassette loading region 204. The ID recognition structure 308 may be incorporated in the image information reading apparatus 10 according to the first embodiment. While the sheet magnet 304 is attached to the cassette 302 housing the double-sided sheet 22b in the illustrated fourth embodiment, the sheet magnet 304 may be attached to a cassette housing a single-sided sheet 22a.

According to the present invention, the cassette has on its outer surface the first ID indicating means which is used when the user registers ID information and the second ID indicating means for reading ID information with the loading apparatus in which the cassette is loaded. Therefore, various items of information relative to the stimulable phosphor sheet housed in the cassette can reliably be read. Even though a bar code or the like cannot directly be applied to a double-sided sheet having a transparent base, ID information of the double-sided sheet can be read through the second ID indicating means that is attached to the cassette that houses the double-sided sheet. Consequently, various stimulable phosphor sheets can efficiently be processed by the image information reading apparatus.

Inasmuch as the single image information reading apparatus is capable of well processing both a single-sided sheet and a double-sided sheet, the image information reading apparatus can effectively be used as a shared machine for greatly increased versatility. The single image information reading apparatus is highly economical because its equipment cost and installation space is much smaller than if two image information reading apparatus dedicated respectively to single-sided sheets and double-sided sheets were employed.

Although certain preferred embodiments of the present invention have been shown and described in detail, it should be understood that various changes and modifications may be made therein without departing from the scope of the appended claims.

What is claimed is:

1. A cassette for housing a stimulable phosphor sheet, comprising:
   first ID indicating means disposed on an outer surface of the cassette, for being used for the user to register ID information; and
   second ID indicating means for being used to read ID information through a loading apparatus for loading the cassette therein.

2. A cassette according to claim 1, wherein said second ID indicating means is disposed on a positioning reference surface of the cassette in a predetermined area thereof.

3. A cassette according to claim 1, wherein said second ID indicating means is disposed in an area spaced a predetermined distance transversely from a positioning reference surface of the cassette.

4. A cassette according to claim 3, wherein said second ID indicating means is disposed on an openable and closable lid of the cassette.

5. A cassette according to claim 1, wherein at least one of said first ID indicating means and said second ID indicating means bears recorded information for determining whether the stimulable phosphor sheet is either a single-sided sheet for emitting light from a recording layer thereof when stimulating light is applied to the recording layer or a double-sided sheet for emitting light from opposite surfaces thereof when stimulating light is applied to a recording layer thereof.

6. A cassette according to claim 1, further comprising cushioning members mounted on inner wall surfaces thereof in facing relationship to a recording layer of the stimulable phosphor sheet and a reverse side thereof opposite to said recording layer.

7. A cassette according to claim 6, wherein each of said cushioning members comprises a nonwoven fabric sheet or a fabric sheet.

8. An ID recognition structure for recognizing ID information carried by a cassette for housing a stimulable phosphor sheet when the cassette is loaded into a loading apparatus, comprising:
   first ID indicating means disposed on an outer surface of the cassette, for being used for the user to register ID information;
   second ID indicating means disposed on a positioning reference surface of the cassette in a predetermined area thereof; and
   reading means disposed in the loading apparatus, for reading said second ID indicating means.

9. An ID recognition structure according to claim 8, wherein at least one of said first ID indicating means and said second ID indicating means bears recorded information for determining whether the stimulable phosphor sheet is either a single-sided sheet for emitting light from a recording layer thereof when stimulating light is applied to the recording layer or a double-sided sheet for emitting light from opposite surfaces thereof when stimulating light is applied to a recording layer thereof.

10. An ID recognition structure for recognizing ID information carried by a cassette for housing a stimulable phosphor sheet when the cassette is loaded into a loading apparatus, comprising:
   first ID indicating disposed on an outer surface of the cassette, for being used for the user to register ID information;
   second ID indicating means disposed in an area spaced a predetermined distance transversely from a positioning reference surface of the cassette; and
   reading means disposed in the loading apparatus, for reading said second ID indicating means.

11. An ID recognition structure according to claim 10, wherein at least one of said first ID indicating means and said second ID indicating means bears recorded information for determining whether the stimulable phosphor sheet is either a single-sided sheet for emitting light from a recording layer thereof when stimulating light is applied to the recording layer or a double-sided sheet for emitting light from opposite surfaces thereof when stimulating light is applied to a recording layer thereof.

12. An image information reading apparatus comprising:
   a cassette loading region for removably loading a cassette for housing a stimulable phosphor sheet which is either a single-sided sheet for emitting light from a recording layer thereof when stimulating light is applied to the recording layer or a double-sided sheet for emitting light from opposite surfaces thereof when stimulating light is applied to a recording layer thereof;

a sheet feeder for removing said stimulable phosphor sheet from said cassette;

a reading unit for reading radiation image information recorded in said stimulable phosphor sheet;

an erasure unit for erasing remaining radiation image information from said stimulable phosphor sheet after the radiation image information has been read by said reading unit; and a sheet identifying assembly for determining whether the stimulable phosphor sheet housed in said cassette loaded in cassette loading region is either said single-sided sheet or said double-sided sheet.

13. An image information reading apparatus according to claim 12, wherein said sheet identifying assembly comprises:

an identification medium disposed on said cassette housing at least said double-sided sheet; and reading means disposed in said apparatus, for reading said identification medium to determine whether said stimulable phosphor sheet is either said single-sided sheet or said double-sided sheet.

14. An image information reading apparatus according to claim 12, wherein said reading unit comprises:

first light guiding means disposed on the side of said recording layer of the stimulable phosphor sheet, for guiding the light emitted from the stimulable phosphor sheet; and second light guiding means disposed on the reverse side of the stimulable phosphor sheet opposite to said recording layer, for guiding the light emitted from the stimulable phosphor sheet when said stimulable phosphor sheet is the double-sided sheet.

15. An image information reading apparatus according to claim 14, wherein said erasure unit comprises:

a first erasing unit for applying erasing light to said recording layer of the stimulable phosphor sheet; and a second erasing unit for applying erasing light to the reverse side of the stimulable phosphor sheet opposite to said recording layer when said stimulable phosphor sheet is the double-sided sheet.

16. An image information reading apparatus according to claim 15, further comprising:

control means for being supplied with an identification signal from said reading means and turning on and off at least one of said second light guiding means and said second erasing unit based on said identification signal.

* * * * *